United States Patent
Ide

(10) Patent No.: US 7,286,920 B2
(45) Date of Patent: Oct. 23, 2007

(54) COLLISION DETERMINING DEVICE

(75) Inventor: Seiya Ide, Okazaki (JP)

(73) Assignee: DENSO CORPORATION, Kariya (JP)

( * ) Notice: Subject to any disclaimer, the term of this patent is extended or adjusted under 35 U.S.C. 154(b) by 373 days.

(21) Appl. No.: 10/878,608

(22) Filed: Jun. 29, 2004

(65) Prior Publication Data
US 2005/0055146 A1    Mar. 10, 2005

(30) Foreign Application Priority Data
Sep. 5, 2003    (JP) .............................. 2003-314693

(51) Int. Cl.
*B60R 21/32* (2006.01)
(52) U.S. Cl. ...................................... 701/45
(58) Field of Classification Search .................... 701/45
See application file for complete search history.

(56) References Cited

U.S. PATENT DOCUMENTS

| 5,544,915 | A | 8/1996 | Fendt et al. |
| 6,005,479 | A | 12/1999 | Ide |
| 6,018,980 | A * | 2/2000 | Kimura et al. ............. 73/12.04 |
| 2005/0006885 | A1 | 1/2005 | Link et al. |
| 2005/0055146 | A1 | 3/2005 | Ide |

OTHER PUBLICATIONS

Office Action issued from French Patent Office issued on Nov. 15, 2005 for the corresponding French patent application No. 2003-314693 (a copy and English translation thereof).

\* cited by examiner

*Primary Examiner*—Thu V. Nguyen
(74) *Attorney, Agent, or Firm*—Posz Law Group, PLC

(57) ABSTRACT

Satellite sensors are disposed in both sidewalls of a vehicle; each of the satellite sensors detects as an acceleration a collision of an obstruction with the corresponding sidewall. A floor G sensor is disposed in a central portion of the vehicle for detecting as an acceleration a collision of an obstruction with either of both the sidewalls. A two-dimensional correlational map is produced to have two parameters of an acceleration detected by the satellite sensor and speed variation derived from an acceleration detected by the floor G sensor. A collision determining threshold line is set on the correlational map. When a tracking line crosses the threshold line from the side containing the original point to the other side, a collision occurrence of a given pattern requiring activation of an occupant protection device is determined.

7 Claims, 7 Drawing Sheets

COLLISION DETERMINING DEVICE

CROSS REFERENCE TO RELATED APPLICATIONS

This application is based on and incorporates herein by reference Japanese Patent Application No. 2003-314693 filed on Sep. 5, 2003.

FIELD OF THE INVENTION

The present invention relates to a collision determining device installed in a vehicular occupant protection system.

BACKGROUND OF THE INVENTION

A vehicular occupant protection system is proposed, for instance, in JP-H8-67231A (US005544915A). Here, the system includes a center acceleration sensor located in a center of the vehicle and left and right sidewall acceleration sensors located around center pillars of the left and right sidewalls of the vehicle. The center acceleration sensor detects a collision of an obstruction with the front or side of the vehicle; the left and right sidewall acceleration sensors, with the left and right sidewalls, respectively.

A collision of the vehicle is determined when the center acceleration sensor detects a sensing level exceeding the highest (largest) threshold of multiple thresholds, or when the center acceleration sensor detects a sensing level exceeding a threshold lower (smaller) than the highest and one of the sidewall acceleration sensors detects a sensing level exceeding a given threshold. Determining of the collision activates the occupant protection system.

Further, another occupant protection system is proposed in JP-H11-180249 (US006005479A) by the same applicant as that of this application. Here, collision of a vehicle is determined by using a phase difference in detected acceleration between a sidewall and center acceleration sensors. In detail, a collision pattern is determined by estimating an equivalent of an intrusion amount of a vehicle as an obstruction, using a phase (or time) difference in integration output of detected acceleration between the sidewall and center acceleration sensors. The phase difference is determined by a time difference between when integration output of the center acceleration sensor exceeds a threshold and when integration output of the sidewall acceleration sensor exceeds a threshold.

SUMMARY OF THE INVENTION

It is an object of the present invention to provide, in a vehicular occupant protection system for a collision, a collision determining device where determining of a collision pattern is enhanced and a response time is shortened.

To achieve the above object, a collision determining device is provided with the following. A sidewall acceleration sensor is disposed in at least one of both sidewalls of the vehicle for detecting as an acceleration a collision of an obstruction with the at least one of the both sidewalls. A center acceleration sensor is disposed in a central portion of a body of the vehicle for detecting as an acceleration a collision of an obstruction with the at least one of the both sidewalls. A collision determining unit is disposed for determining a collision occurrence of a given pattern requiring activation of the occupant protection device. A correlational map is produced to have, along with a collision determining threshold line, two parameters of a first collision estimating amount derived from an acceleration detected by the sidewall acceleration sensor and a second collision estimating amount derived from an acceleration detected by the center acceleration sensor. Here, the collision determining unit determines the collision occurrence of the given pattern requiring activation of the occupant protection device when a tracking line that indicates a correlation between the first collision estimating amount and the second collision estimating amount crosses the collision determining threshold line from a side containing an original point of the map to another side.

A correlation between the first collision estimating amount derived from an acceleration detected by the sidewall acceleration sensor and the second collision estimating amount derived from an acceleration detected by the center acceleration sensor is differentiated by a pattern of the collision occurrence. Therefore, in the above structure, a pattern of a collision occurrence can be reliably and quickly determined using a correlational map.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
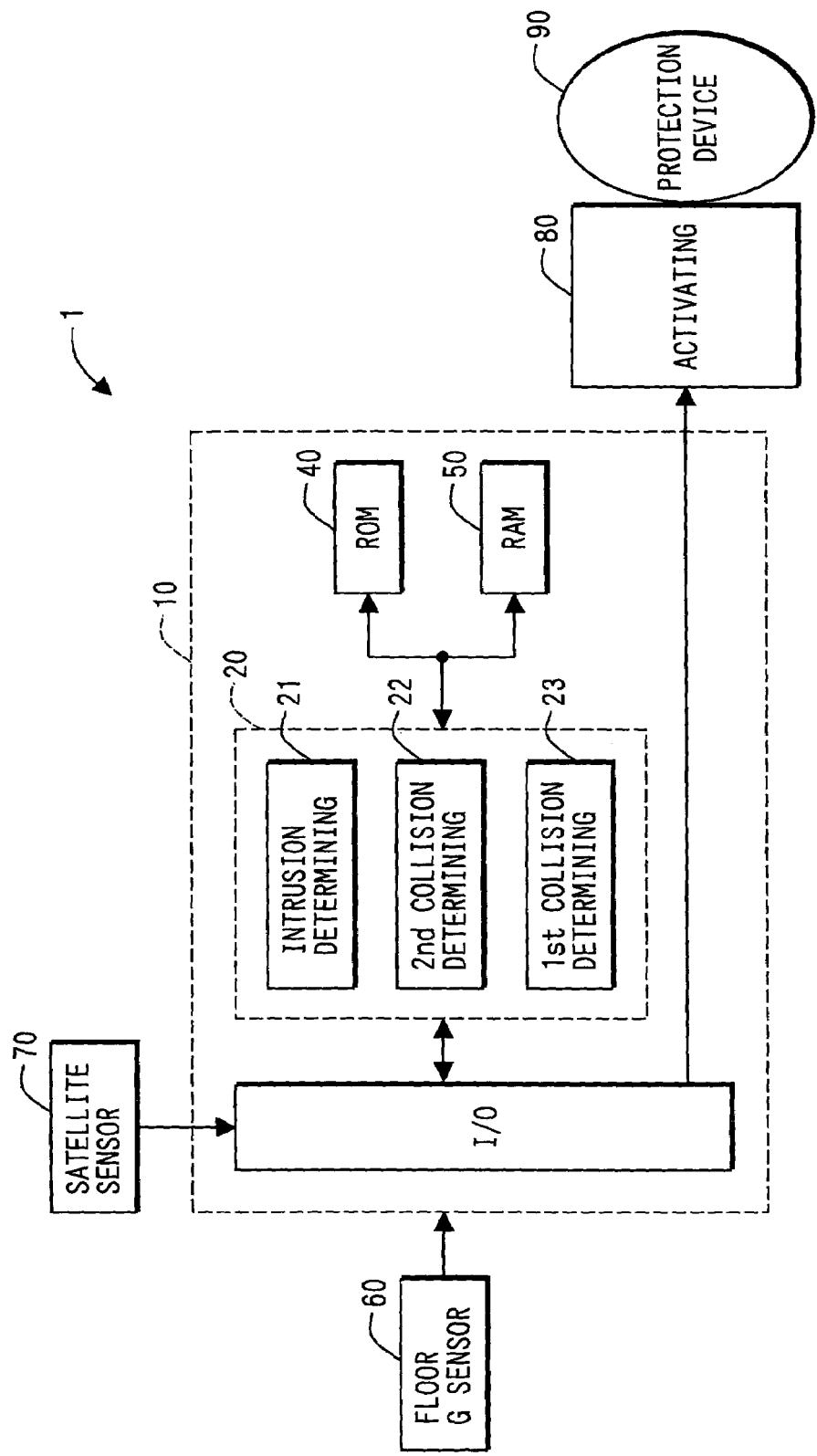
FIG. 1 is a block diagram of a vehicular occupant protection system for collision according to an embodiment of the present invention.

An occupant protection system 1 according to an embodiment of the present invention will be explained regarding its overall structure with reference to FIG. 1. The system 1 includes a controlling circuit 10, a floor G sensor 60 as a center acceleration sensor, a satellite sensor 70 as a sidewall acceleration sensor, an activating circuit 80, and an occupant protection device 90.

The protection device 90 is constituted by a right (driver seat) airbag and a left (front passenger seat) airbag. These airbags are expanded by the corresponding right and left parts of the activating circuit 80. These right and left airbags protect the occupants seated in the driver seat and front passenger seat against collisions to a right and left sides of the vehicle, respectively.

The floor G sensor 60 is disposed in a bottom wall of an interior of the vehicle so as to be located in a central portion of the vehicle; however, the sensor 60 can be in other locations instead of the bottom wall as long as it can be located in the central portion of the vehicle. Further, as long as an intrusion amount can be estimated, the sensor 60 can be biased in a front-rear direction of the vehicle.

Figure 2:
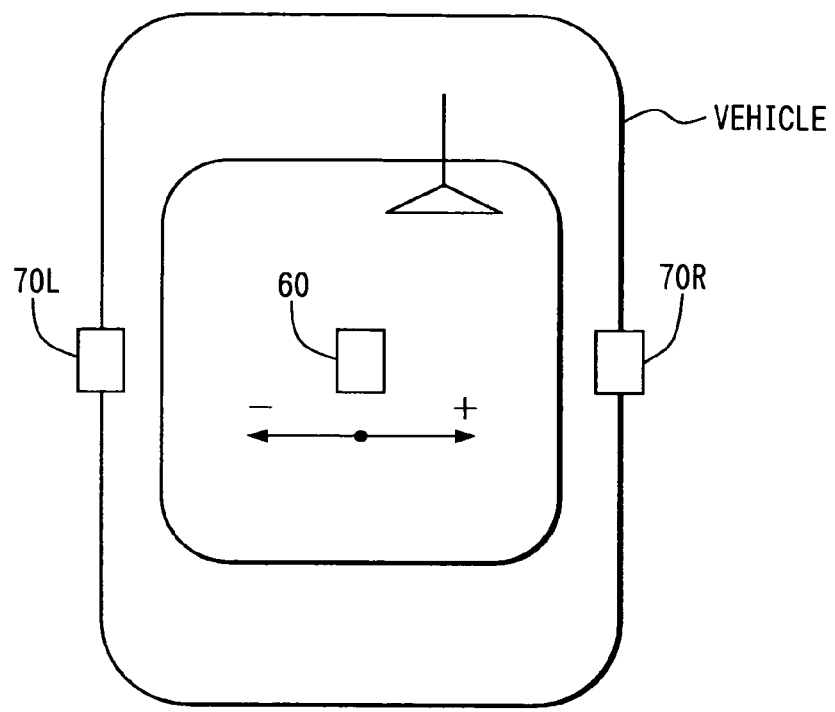
FIG. 2 is a view showing locations of acceleration sensors in a vehicle.

The floor G sensor 60 detects and outputs as an acceleration signal an acceleration that arises when the left or right sidewall of the relevant vehicle collides with an obstruction such as another vehicle. Here, the sensor 60 is disposed to detect, as a positive value, the acceleration arising based on the collision of the right sidewall with the obstruction; while as a negative value, based on the collision of the left sidewall, as shown in FIG. 2.

The satellite sensor 70 includes a right satellite sensor 70R and left satellite sensor 70L. The right or left satellite sensor 70R, 70L is disposed in the wall close to the center pillar of the right or left sidewall of the vehicle, detecting and outputting as an acceleration signal an acceleration that arises when the right or left sidewall of the relevant vehicle collides with an obstruction, respectively.

The controlling circuit 10 includes a determining circuit 20, an input/output (I/O) circuit 30, a ROM 40, and a RAM 50, detecting a collision occurrence based on outputs from the floor G sensor 60 and satellite sensor 70.

Figure 3:
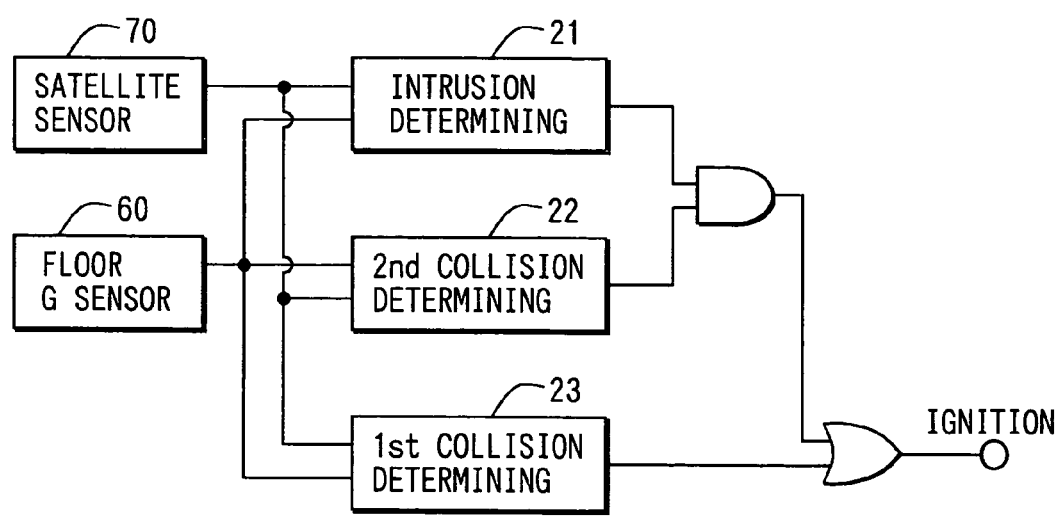
FIG. 3 is a block diagram of a logical structure of a determining circuit.
Figure 4A:
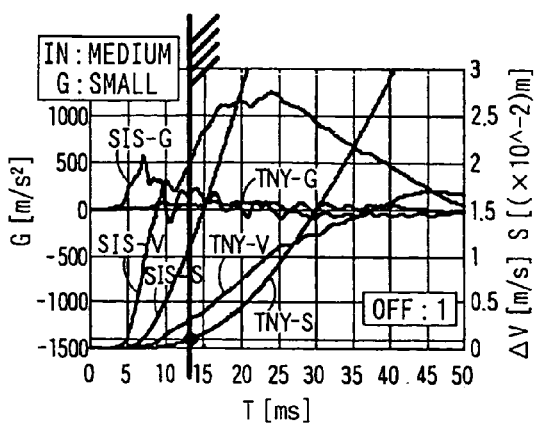
FIGS. 4A to 4F are graphs showing examples of ON and OFF requirements.
Figure 4D:
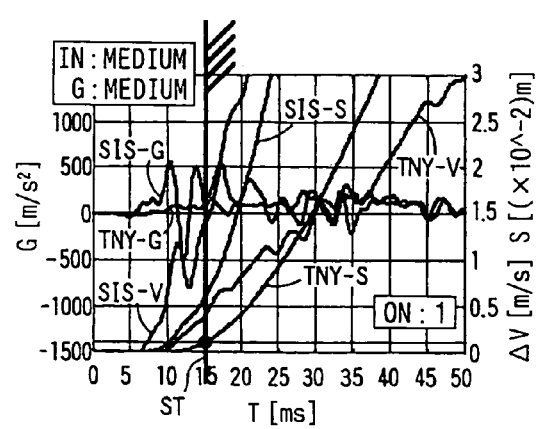
Figure 4B:
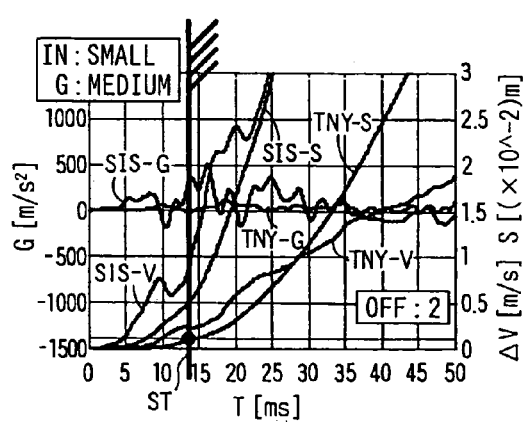
Figure 4E:
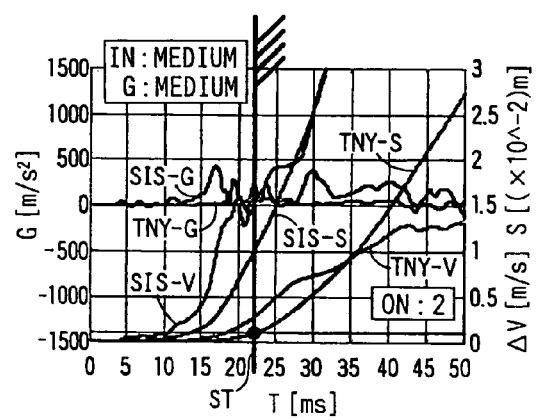
Figure 4C:
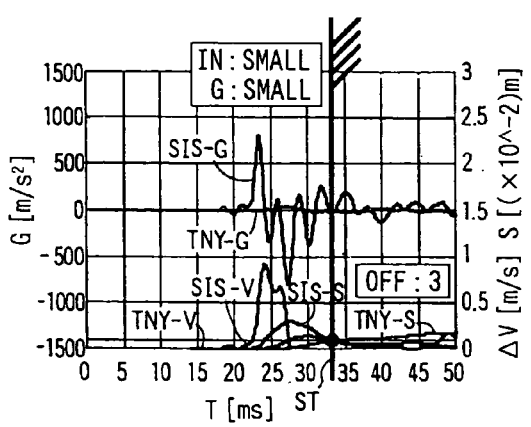
Figure 4F:
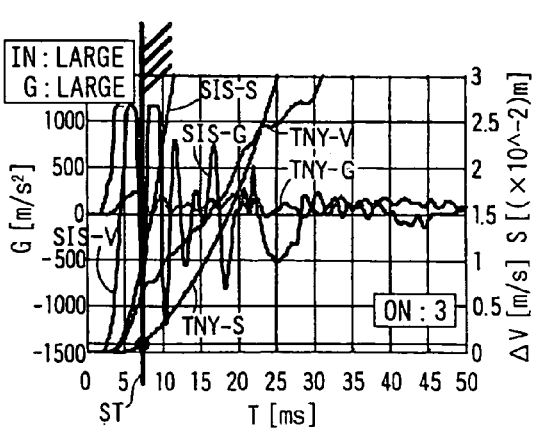

The determining circuit 20 is constructed, in detail, of a CPU (not shown). This CPU reads out and executes a control program stored in the ROM 40, so that an intrusion amount determining unit 21, second and first collision determining units 22, 23 are realized. As shown in FIG. 3, the determining circuit 20 executes collision determining using a logical addition (OR) between outputs of the first collision determining unit 23 and a logical multiplication (AND); the logical multiplication (AND) is between outputs of the intrusion amount determining unit 21 and second collision determining unit 22. Upon executing the collision determining, the circuit 20 outputs an igniting signal for activating the protection device 90 via the I/O circuit to the activating circuit 80.

Next, an operation of the parts of the determining circuit 20 will be explained. Hereinafter, a collision pattern requiring activation of the protection device 90 is referred to as ON requirement; a collision pattern not-requiring activation of the protection device 90 is referred to as OFF requirement. FIG. 4 illustrates operative examples of ON requirements and OFF requirements using graphs showing: an arising G (acceleration) around a starting time of lateral movement of the vehicle (acceleration detected by the satellite sensor 70); a speed variation (SV) ([one-time] integration value of the acceleration detected by the floor G sensor 60); and a movement amount (S) (double integration value of the acceleration detected by the floor G sensor 60). ON requirements 1 and ON requirement 2 correspond to "Intrusion amount (IN): Medium, Arising G: Medium" in FIGS. 4D, 4E; ON requirement 3, "Intrusion amount: Large, Arising G: Large" in FIG. 4F; OFF requirement 1, "Intrusion amount: Medium, Arising G: Small" in FIG. 4A; OFF requirement 2, "Intrusion amount: Small, Arising G: Medium" in FIG. 4B; OFF requirement 3, "Intrusion amount: Small, Arising G: Small" in FIG. 4C. Here, in FIGS. 4A to 4F, "SIS" means data obtained from the output of the satellite sensor 70; "TNY", from the output of the floor G sensor 60. Further, "-G" means an acceleration (G); "-V," a speed variation (SV); "-S," a movement amount (S). As shown in FIGS. 4A to 4F, ON requirements have relatively large amounts in acceleration, speed variation, and movement amount relative to the satellite sensor 70 up to the starting time (ST) of the lateral movement of the vehicle, in comparison with OFF requirements.

Figure 5:
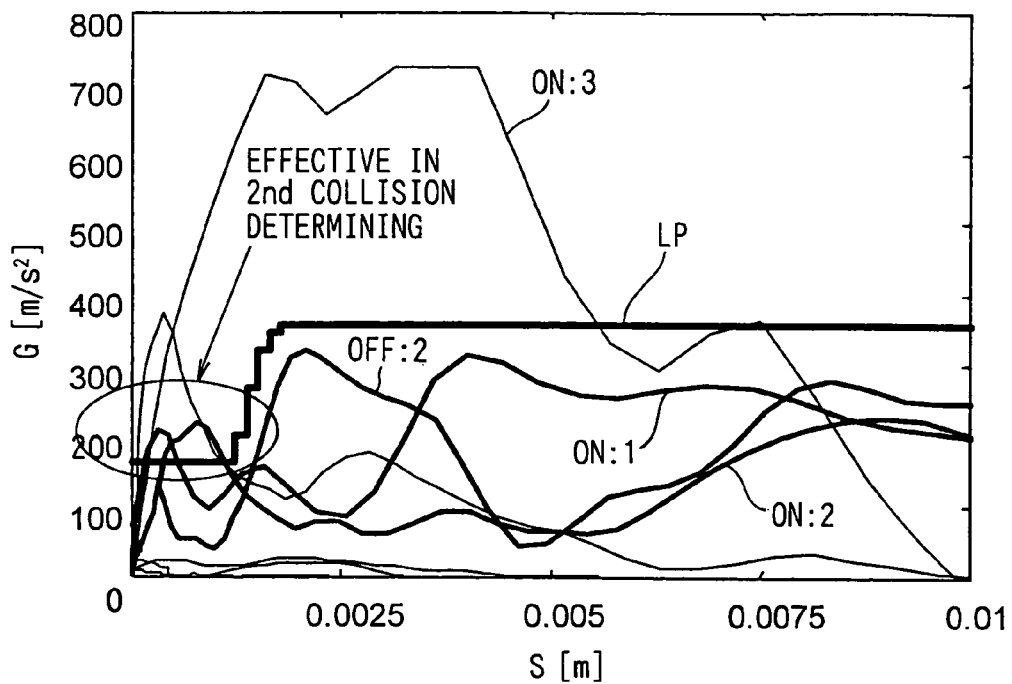
FIG. 5 is a correlational map for determining an intrusion amount in an intrusion amount determining unit.

The intrusion amount determining unit 21 determines a deformation amount of the vehicle, namely an intrusion amount of the obstruction into the relevant vehicle. An intrusion amount determining process will be explained with reference to FIG. 5. FIG. 5 is a two-dimensional correlational map for the intrusion amount determining, the map which has a lateral axis of a lateral movement amount of the vehicle (2nd intrusion estimating amount) and a longitudinal axis of an arising G at the sidewall of the vehicle (1st intrusion estimating amount). The lateral movement amount of the vehicle is a double integration value of the acceleration detected by the floor G sensor 60; the arising G at the sidewall of the vehicle is an acceleration detected by the satellite sensor 70.

A tracking line shows a transitional movement of the lateral movement amount (S) and arising G (G) posterior to the starting time of the lateral movement of the vehicle. An intrusion amount determining threshold line LP is a threshold of the arising G relative to the lateral movement. The threshold line LP is set to a relatively small constant value (e.g., 180 m/s$^2$) within a range less than a given lateral movement amount (e.g., <0.0015 m); the threshold line LP is increased with increasing lateral movement and is set to a relatively large constant value (e.g., 380 m/s$^2$) within a range more than a certain lateral movement amount. Here, when the tracking line crosses the intrusion amount determining threshold line LP from the side of the original point of the graph to the other side, the intrusion amount is regarded as a large level or medium level; when the tracking line does not cross, regarded as a small level. Accordingly, the intrusion amount determining unit 21 can reliably determine the intrusion amount by monitoring the acceleration arising at the sidewall of the vehicle at an initial stage (i.e., while the lateral movement amount is small). For instance, the tracking lines of ON requirements 1, 2 having a large G just after the starting time of the lateral movement across the threshold line LP, so that they are regarded as having a large or medium amount of the intrusion. Thus, the intrusion amount determining unit 21 can reliably determine ON requirements 1, 2 (Intrusion amount: Medium) having the large arising G just after the starting time of the lateral movement, and OFF requirement 2 (Intrusion amount: Small) having the small arising G.

Figure 6:
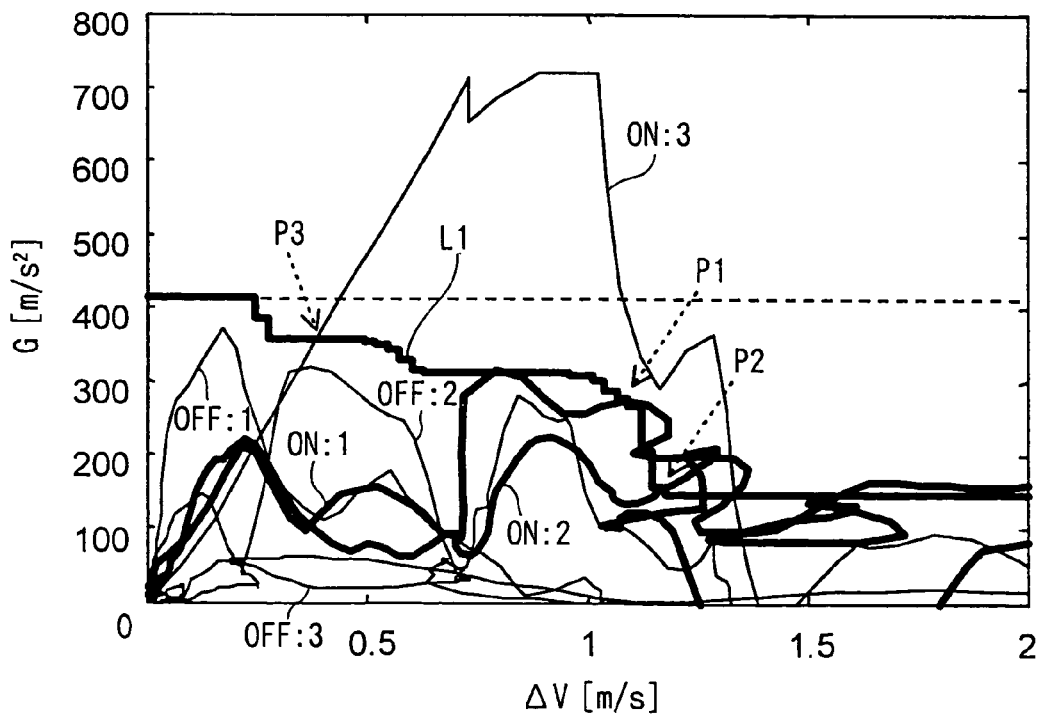
FIG. 6 is a correlational map for determining a collision in a first collision determining unit.

The first collision determining unit 23 determines presence or absence of a collision occurrence requiring activation of the protection device 90 by an arising G at the sidewall of the vehicle and a speed variation ΔV of the vehicle. A collision determining process of the first collision determining unit 23 will be explained with reference to FIG. 6. FIG. 6 is a two-dimensional correlational map for the collision determining, the map which has a lateral axis of a speed variation ΔV of the vehicle (2nd collision estimating amount) and a longitudinal axis of an arising G (G) at the sidewall of the vehicle (1st collision estimating amount). The speed variation ΔV of the vehicle is a (one-time) integration value of the acceleration detected by the floor G sensor 60; the arising G at the sidewall of the vehicle is an acceleration detected by the satellite sensor 70. A tracking line shows a transitional movement of the speed variation ΔV and arising G posterior to the starting time of the lateral movement of the vehicle. A first collision determining threshold line L1 is a threshold of the arising G relative to the speed variation ΔV. When the tracking line crosses the first collision determining threshold line L1 from the side of the original point of the graph to the other side, it is determined that a collision requiring activation of the protection device 90 occurs.

Figure 7A:
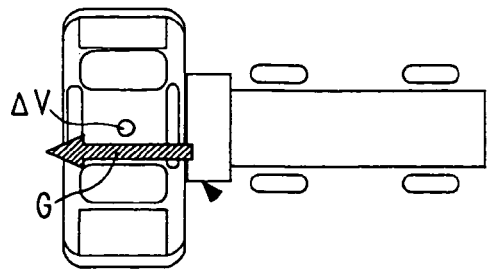
FIGS. 7A to 7C are views showing vehicle behaviors at collision to a side of a vehicle.
Figure 7B:
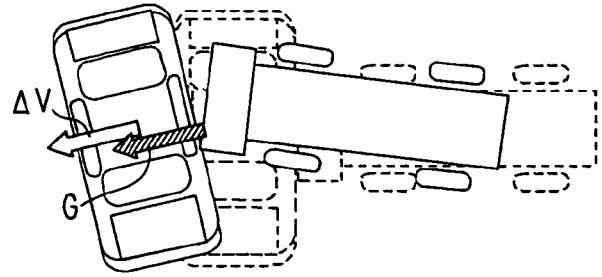
Figure 7C:
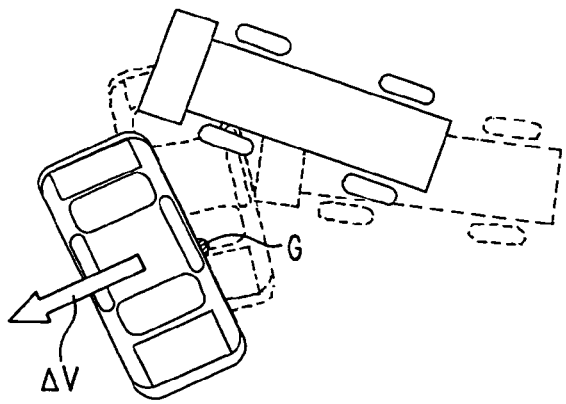
Figure 8:
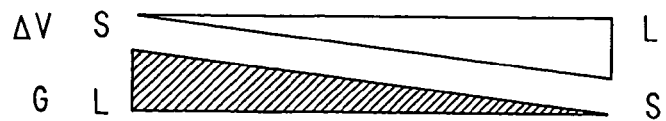
FIG. 8 is a diagram showing a relationship between speed variation and arising G at collision.
Figure 9:
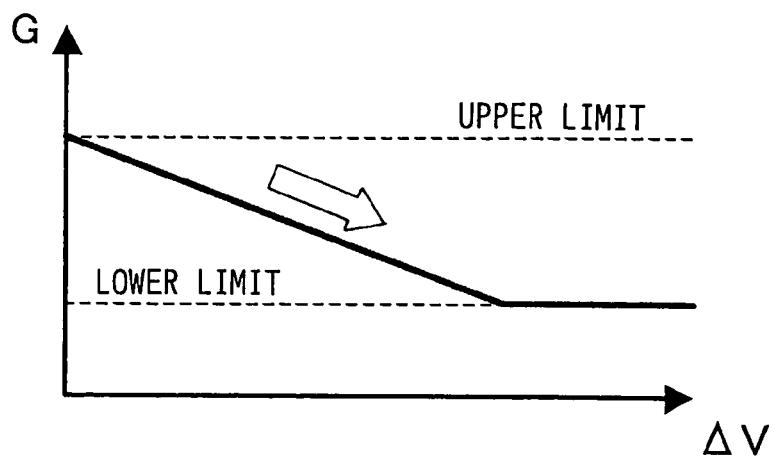
FIG. 9 is a graph explaining adequacy of a rightward-descending collision determining threshold line.

Here, the threshold line L1 is set as a rightward descending line as shown in FIG. 6, which is derived from a relationship between the speed variation ΔV and arising G at the collision time point. Namely, when a collision occurs, at the initial stage, the arising G is large while the speed variation ΔV is scarcely small, as shown in FIG. 7A. At the intermediate stage, the arising G is decreased to medium while the speed variation ΔV is increased, as shown in FIG. 7B. At the final stage, the arising G is decreased to scarcely small while the speed variation ΔV is further increased, as shown in FIG. 7C. Thus, a relationship between the speed variation ΔV and arising G is shown in FIG. 8. The speed variation ΔV increases from the initial stage to the final stage, while the arising G, decreases. This relationship is further shown as a map having a rightward descending line in FIG. 9, where the map has a lateral axis of a speed variation ΔV and a longitudinal axis of an arising G (G). Further, the upper limit shows the largest G for OFF requirement; the lower limit shows the smallest G for ON requirement.

Accordingly, since the first collision determining threshold line L1 is configured as the rightward descending line, ON and OFF requirements are reliably determined. Namely, the tracking line for ON requirements 1 to 3 cross the threshold line L1 from the side of the original point to the other side, so that the collision occurrence requiring activation of the protection device 90 is determined. In FIG. 6, the tracking lines of ON requirements 1, 2, 3 cross the threshold line L1 at P1, P2, P3, respectively. By contrast, OFF requirements 1 to 3 once increases just after the starting time of the lateral movement and then decreases without crossing over the threshold line L1, so that activating the protection device 90 is determined to be unnecessary.

Figure 11:
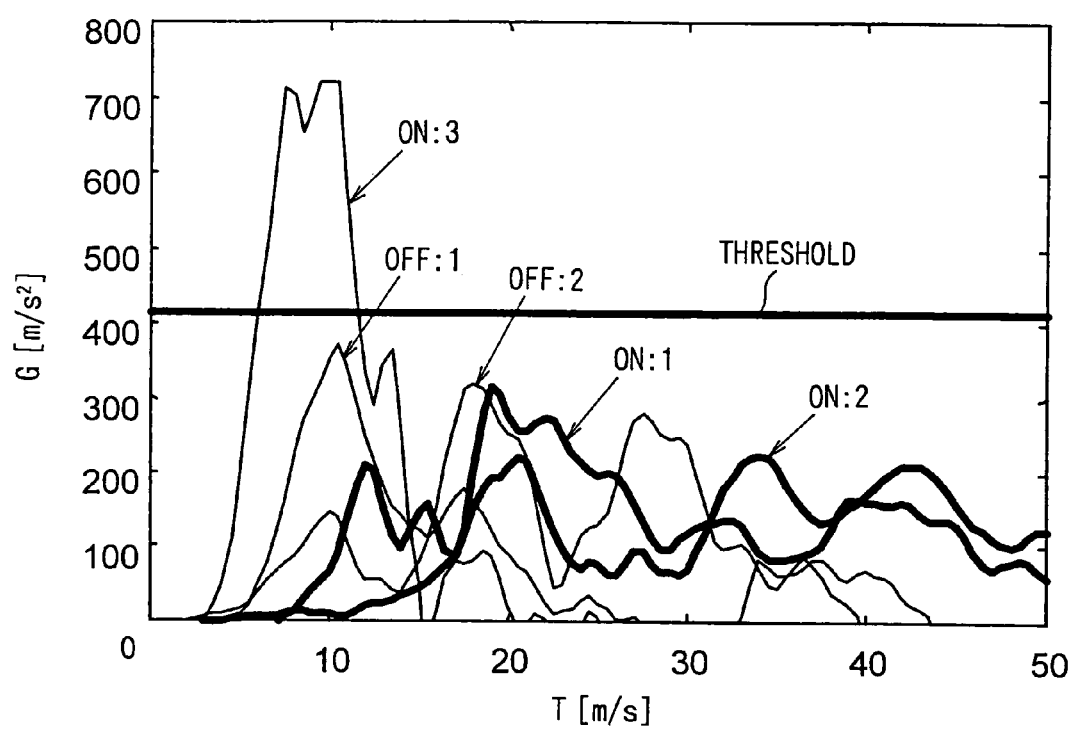
FIG. 11 is a graph explaining collision determining of a related art.

Here, to compare with a related art, FIG. 11 shows a method where the collision is determined only based on whether the arising G at the sidewall of the vehicle exceeds a threshold line. As shown in FIG. 11, ON requirements 1,2 are mistakenly determined to be not requiring activation of the protection device 90, while ON requirement 3 is properly determined to be requiring activation.

Figure 10:
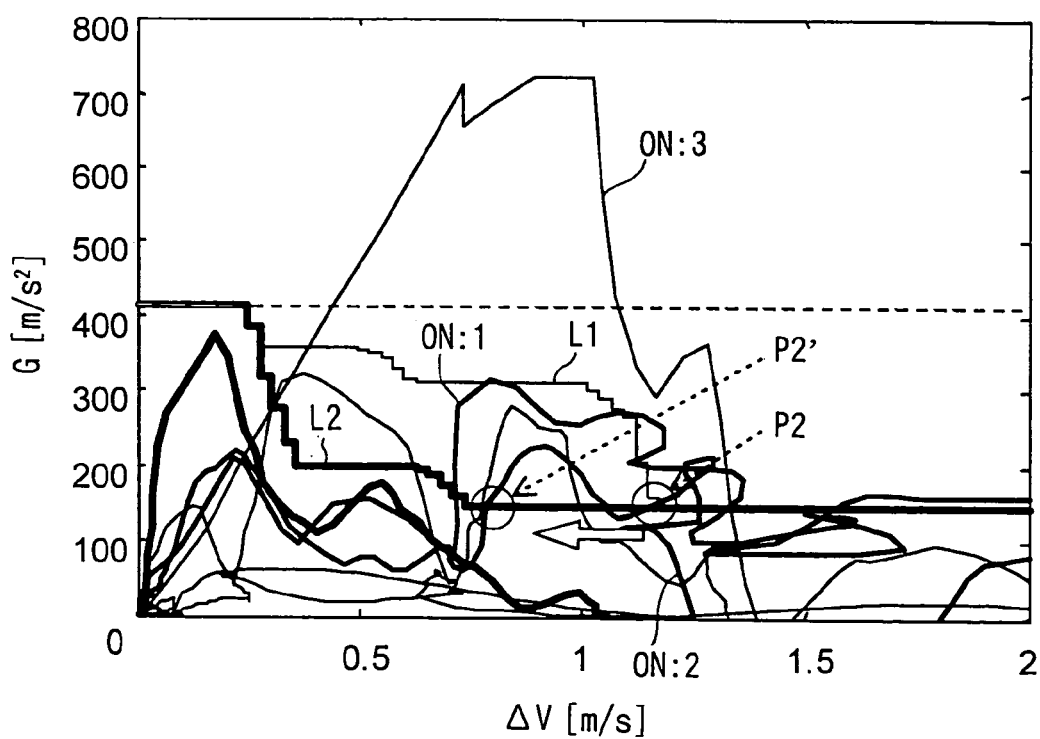
FIG. 10 is a correlational map for determining a collision in a second collision determining unit.

Furthermore, the second collision determining unit 22 determines presence or absence of a collision occurrence requiring activation of the protection device 90, similarly with the first collision determining unit 23, using a tracking line and a second collision threshold line L2. The tracking line indicates a transitional movement of an arising G at the sidewall of the vehicle and a speed variation ΔV of the vehicle after the starting time of the lateral movement of the vehicle. Here, the second threshold line L2 is only available for tracking lines having intrusion amounts of large and medium; the second threshold line L2 is set to smaller (lower) than the first threshold line L1 in a portion where the lines are rightward descending, as shown in FIG. 10. Namely, the first threshold line L1 is set so that disturbance (local impact such as door closing) other than collision does not activate the protection device 90. By contrast, the second threshold line L2 is applied to a case where the intrusion amount determining unit 21 determines "Intrusion amount: Large or Medium" (refer to FIG. 5), so that the threshold line L2 can be set to the smaller without considering the disturbance. As a result, using the intrusion amount determining unit 21 and second collision determining unit 22, the protection device 90 can quickly respond in a case where the intrusion amount is large or medium. In FIG. 10, after the staring time point of the lateral movement, the tracking lines of ON requirements 1 to 3 cross the second threshold line L2 earlier than the first threshold line L1 that is larger than the second threshold line L2, so that the protection device 90 can quickly respond. For instance, the tracking line of ON requirement 2 crosses the second threshold line L2 at P2' while it crosses the first threshold line L1 at P2. Here, P2' is remarkably earlier than P2, so that the quick response of the protection device 90 can be clearly verified.

Modifications

In the embodiment, the first and second collision determining units 23, 22 determine a collision using the first collision estimating amount of an arising G at the sidewall of the vehicle and the second collision estimating amount of an speed variation. However, the collision can be determined by properly combining of an estimating amount (acceleration, speed variation, movement amount) from an acceleration detected by a floor G sensor 60 and an estimating amount (acceleration, speed variation, movement amount) from an acceleration detected by a satellite sensor 70, in a comprehensive way.

Further, In the embodiment, the intrusion amount determining unit 21 determines an intrusion estimating amount using the first intrusion amount of an acceleration detected by a floor G sensor 60 and the second intrusion estimating amount of the lateral movement being a double integration value of an acceleration detected by the floor G sensor. However, the intrusion amount can be determined by properly combining of an estimating amounts (acceleration, speed variation, movement amount) obtained from both the sensors 60, 70. For instance, a speed variation being a (one-time) integration value of an acceleration detected by the satellite sensor 70 can be the first intrusion estimating amount.

Furthermore, a collision determining device of the present invention can be directed to various occupant protection systems for activating in-vehicle occupant protection devices that are used for collision from a side of a vehicle.

It will be obvious to those skilled in the art that various changes may be made in the above-described embodiments of the present invention. However, the scope of the present invention should be determined by the following claims.

What is claimed is:

1. A collision determining device for activating an occupant protection device mounted in a vehicle, comprising:
   a sidewall acceleration sensor disposed in at least one of both sidewalls of the vehicle for detecting as an acceleration a collision of an obstruction with the at least one of the both sidewalls;
   a center acceleration sensor disposed in a central portion of a body of the vehicle for detecting as an acceleration a collision of an obstruction with the at least one of the both sidewalls;
   a collision determining unit for determining a collision occurrence of a given pattern requiring activating the occupant protection device; and
   an intrusion amount determining unit for determining an intrusion amount derived from a collision in the vehicle based on a first intrusion estimating amount derived from an acceleration detected by the sidewall acceleration sensor and a second intrusion estimating amount derived from an acceleration detected by the center acceleration sensor,
   wherein a correlational map is produced to have, along with a collision determining threshold line including a first collision determining threshold line and a second collision determining threshold line, two parameters of a first collision estimating amount derived from an acceleration detected by the sidewall acceleration sensor and a second collision estimating amount derived from an acceleration detected by the center acceleration sensor, wherein the collision determining unit determines the collision occurrence of the given pattern requiring activation of the occupant protection device when a tracking line that indicates a correlation between the first collision estimating amount and the second collision estimating amount crosses the collision determining threshold line, and wherein the collision determining unit includes:
- a first collision determining unit for executing a collision determining using the first collision determining threshold line; and
- a second collision determining unit for executing a collision determining using the second collision determining threshold line, wherein the second collision determining threshold line is smaller at least within a range than the first collision determining threshold line and effective only when the intrusion amount determining unit determines that a given intrusion amount is derived.

2. The collision determining device for activating an occupant protection device of claim 1, wherein the first collision estimating amount includes an acceleration detected by the sidewall acceleration sensor, while the second collision estimating amount includes a speed variation being a one-time integration value of an acceleration detected by the center acceleration sensor.

3. The collision determining device for activating an occupant protection device of claim 2, wherein the collision determining threshold line has a portion that is rightward descending on the correlational map where a longitudinal axis is the acceleration detected by the sidewall acceleration sensor and a lateral axis is the speed variation being the one-time integration value of the acceleration detected by the center acceleration sensor.

4. The collision determining device for activating an occupant protection device of claim 1, wherein an additional correlational map is produced to have, along with an intrusion amount determining threshold line, two parameters of the first intrusion estimating amount and the second intrusion estimating amount, and wherein the intrusion determining unit determines that the given intrusion amount is derived when a tracking line that indicates a correlation between the first intrusion estimating amount and the second intrusion estimating amount crosses the intrusion amount determining threshold line.

5. The collision determining device for activating an occupant protection device of claim 1, wherein the first intrusion estimating amount includes an acceleration detected by the sidewall acceleration sensor, while the second intrusion estimating amount includes a lateral movement amount being a double integration value of an acceleration detected by the center acceleration sensor.

6. The collision determining device for activating an occupant protection device of claim 1, wherein the second collision determining threshold line is effective when the intrusion amount determining unit determines that the given intrusion amount is one of large and medium.

7. The collision determining device for activating an occupant protection device of claim 1, wherein the second collision determining threshold line is effective in a condition where the intrusion amount determining unit determines that the given intrusion amount is derived, the condition restricting the second collision determining unit to regard, as a collision, a disturbance including a local impact so as to allow the second collision determining threshold line to be smaller at least within the range than the first collision determining threshold line.

* * * * *